United States Patent

[11] 3,574,284

[72] Inventor Petur Thordarson
 Kefavkik, Iceland
[21] Appl. No. 648,824
[22] Filed June 26, 1967
[45] Patented Apr. 13, 1971
[73] Assignee Laucks Laboratories, Inc.
 Redmond, Wash.

[54] PORE PRESSURE APPARATUS AND METHOD
 5 Claims, 7 Drawing Figs.
[52] U.S. Cl. ..................................................... 73/406
[51] Int. Cl. ..................................................... G01l 7/08
[50] Field of Search ........................................... 73/388,
 406, 407, 94, 152, 420, 395, 396, 152, (Inquired)

[56] References Cited
UNITED STATES PATENTS

| | | | |
|---|---|---|---|
| 1,938,492 | 12/1933 | Moller | 73/388 |
| 2,284,707 | 6/1942 | Wilson | 73/388 |
| 3,134,260 | 5/1964 | Johnston | 73/396 |
| 3,247,712 | 4/1966 | Johnson et al. | 73/152 |
| 3,350,931 | 11/1967 | Johnson et al. | 73/152 |
| 3,388,598 | 6/1968 | Hall | 73/406 |
| 3,318,145 | 5/1967 | Lynn et al. | 73/152 |

Primary Examiner—Donald O. Woodiel
Attorney—Christensen, Sanborn & Matthews

ABSTRACT: This invention is for a method and an apparatus for determining the pore pressure of liquid in the ground and earth structures. This invention makes it possible to determine the pore pressure at various depths in the ground and earth structure. The apparatus can be positioned at the desired depth in the ground or earth structure and the pore pressure determined. The apparatus comprises means for increasing the pressure so as to counteract the pore pressure in the ground. Also, there is a control unit for measuring the pressure. More particularly, there is a diaphragm and a valve means. The valve means connects with the diaphragm. The pore pressure against the diaphragm is counteracted by the pressure from the control means. When the valve means is closed, the pressure is indicated and does not change. It is possible then to know the pore pressure in the ground.

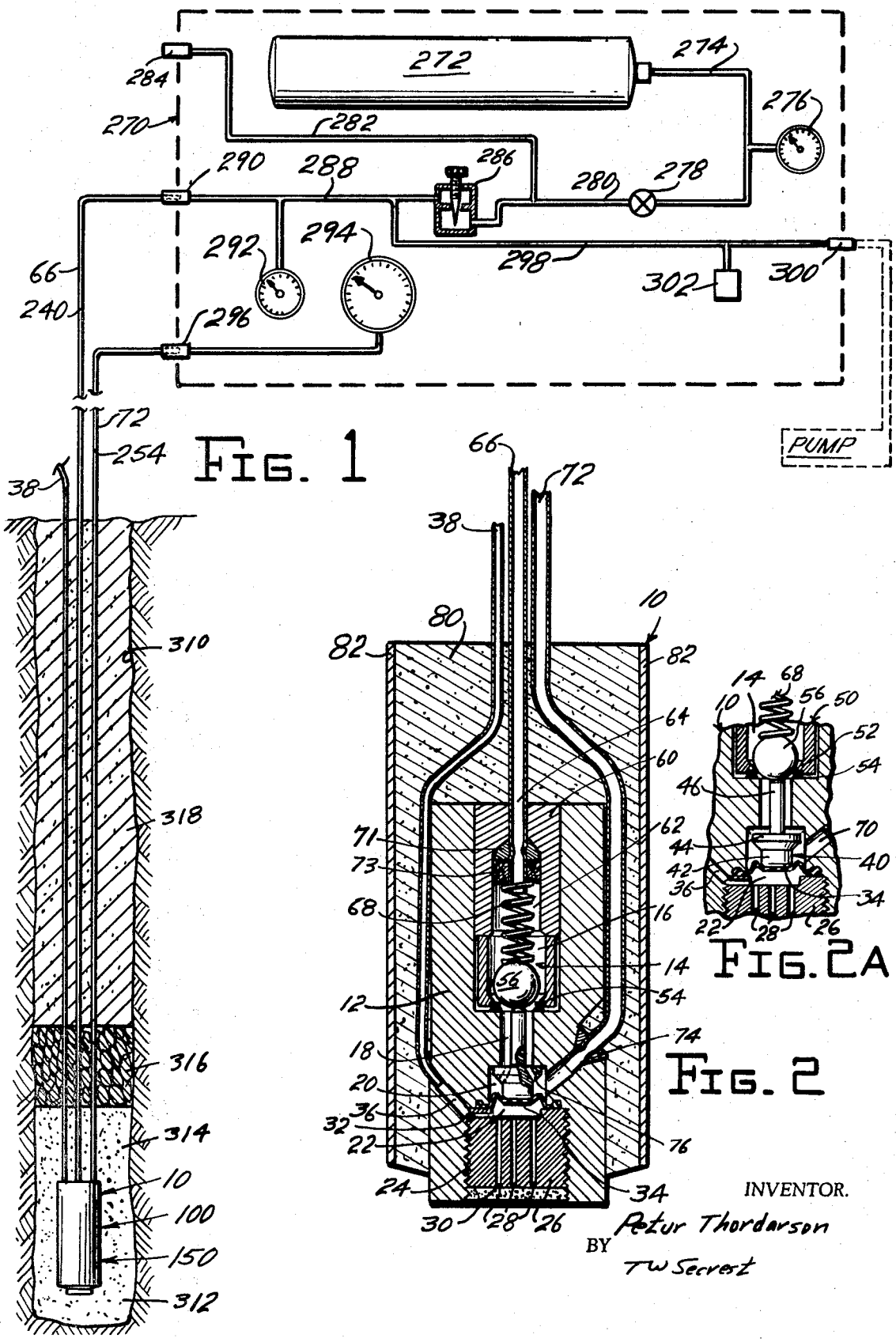

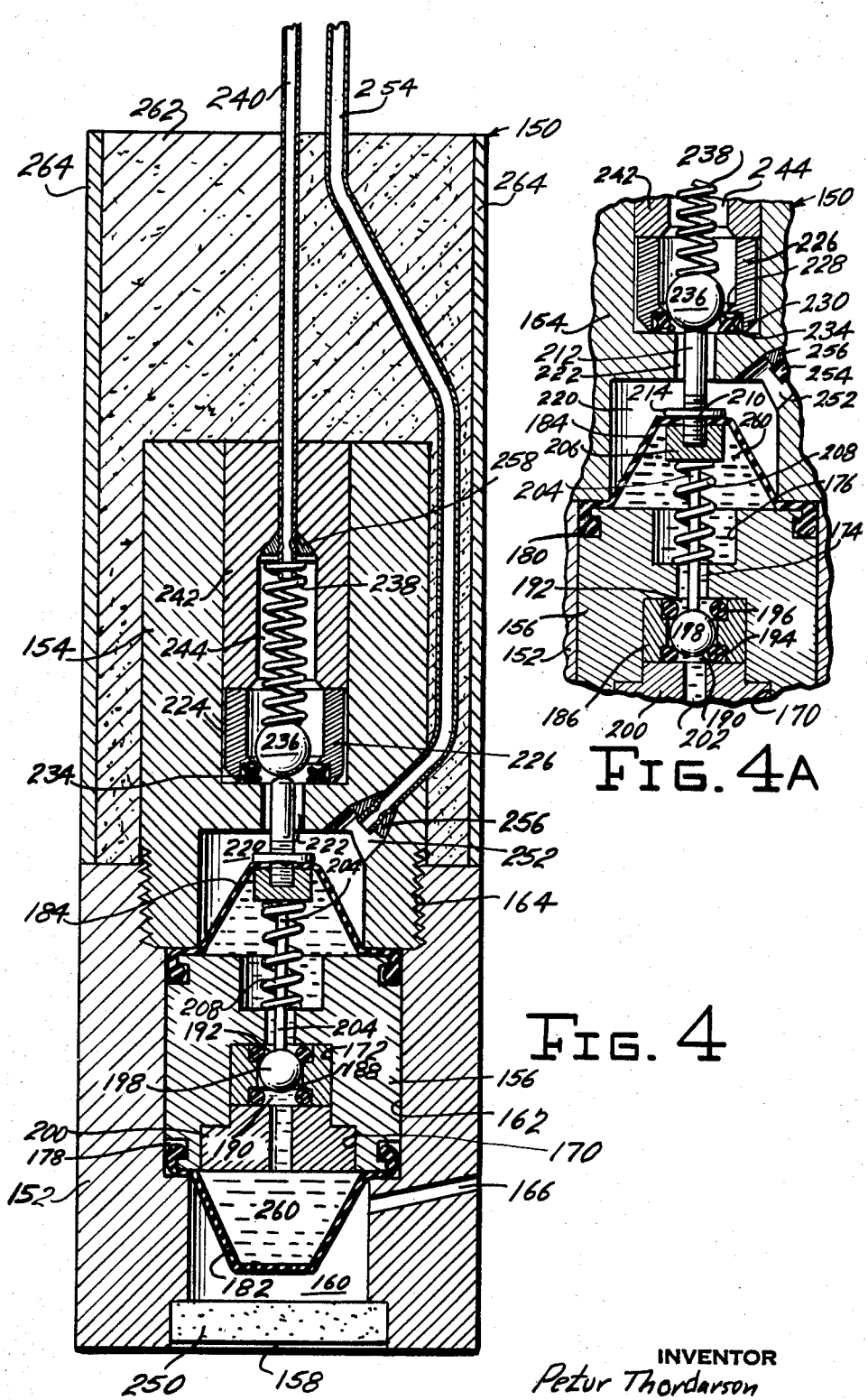

3,574,284

PORE PRESSURE APPARATUS AND METHOD

This invention has many uses, as it can be used to observe the progress of consolidation of embankments and foundation soils which have been constructed by man. Also, this invention can be used to determine the effective stresses for estimating the sheering strengths of embankments and slopes. Further, this invention can be effectively used to evaluate seepage through natural ground or embankments constructed by man. Further, the invention can be used to check the effectiveness of subsurface drainage facilities such as natural subsurface drainage facilities like sand and gravel strata or artificially constructed subsurface drainage facilities such as pipes. Further, in the construction of earth dams, this invention can be profitably used to determine stability control of the earth dam both during the construction of the earth dam and after the construction of the earth dam. Further, the invention can be used to determine the efficiency of the filter zones in earth construction and the use of earth in construction. Also, the invention can be used to provide an indication of the embankment control in earth construction and, also, in naturally occurring earth formations. These above enumerated uses indicate, to a degree, some of the value of the subject invention.

This invention is related to the subject matter of the inventor's copending Pat. application Ser. No. 643,584, filed Jun. 5, 1967, now U.S. Pat. No. 3,456,509 issued Jul. 22, 1969.

An object of this invention is to provide a pore pressure apparatus which will not corrode when placed and buried in the ground and in an earthen structure and subject to the liquids and chemicals in said ground and earthen structure; a further object is to provide a pore pressure apparatus and method having a slight volume displacement so as to give a highly accurate reading of the pore pressure; another object is to provide a pore pressure apparatus and method which is low in cost and installation; a still further object is to provide a pore pressure apparatus and method based on a gaseous system wherein there is no liquid to entrap gas bubbles; another object is to provide a pore pressure apparatus and method wherein it is not required to degas or remove gas from the system; an additional object is to provide a pore pressure apparatus and method having equalizing pressure means running directly from the liquid in the ground or earthen structure to the region outside of the means for reading the pore pressure; an additional object is to provide an apparatus which is easy to operate and can be readily operated; a further object is to provide an apparatus which has negligible time lag in the reading of the pore pressure; a further object is to provide an apparatus which may be used in the vertical position so that there is no water displacement; a still additional object is to provide an apparatus which when placed other than vertical displaces a very small quantity of water such as one-hundredth (0.01 cc.) of a centimeter of either water or liquid; and, a still further object is to provide a pore pressure apparatus which can be used with a portable control case for determining the pore pressure.

These and other important objects and advantages of the invention will be more particularly brought forth upon reference to the specific disclosure of the invention, the appended claims and the drawings for the apparatus.

In the drawings:

FIG. 1 is a schematic illustration of a pore pressure detector in the ground or earthen structure and with the lines leading to the control unit for indicating the pore pressure;

FIG. 2 is a longitudinal cross-sectional illustration of one species of the pore pressure detector and which shows the check valve in an open position;

Figure 3:
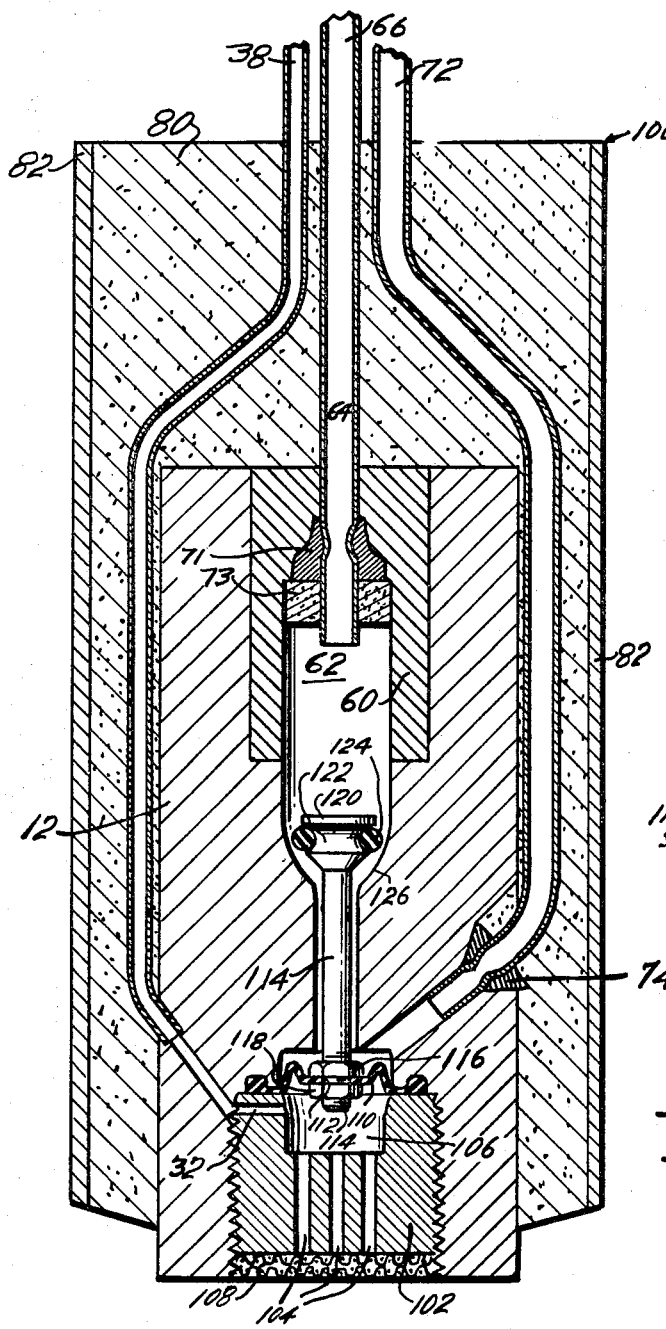
Figure 3A:
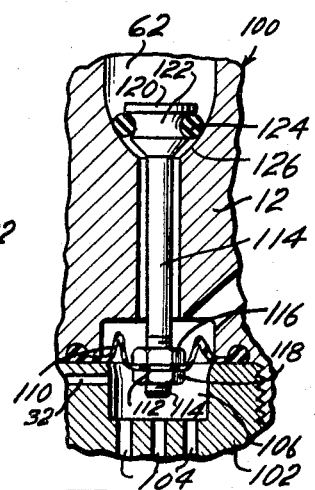

FIG. 2A, on an enlarged scale, is a fragmentary view of the check valve portion of the pore pressure detector and shows the check valve in a closed position;

FIG. 3 is a longitudinal cross-sectional view of a second species of the pore pressure detector and illustrates the check valve in an open position;

FIG. 3A is a fragmentary longitudinal cross-sectional view of the pore pressure detector and illustrates the check valve in a closed position;

FIG. 4 is a longitudinal cross-sectional view illustrating a third species of the pore pressure detector and illustrates the check valve in an open position; and FIG. 4A is a fragmentary longitudinal cross-sectional view of the pore pressure detector and illustrates the check valve in a closed position.

In FIG. 1 there is illustrated a pore pressure detector 10. It is seen that this detector 10 comprises a main body 12. The main body 12 has a main cavity 14.

The cavity 14 can be divided into four interconnecting cavities of varying cross-sectional area. For example, the uppermost cavity 16 connects with the next lower cavity 18. It is seen that the lower cavity 18 is of a smaller lateral cross-sectional area than the cavity 16. Then, the cavity 18 connects with a cavity 20. The cavity 20 is of a larger cross-sectional area than the cavity 18. And, the cavity 20 connects with a cavity 22. The cavity 22 is larger in cross-sectional area than the cavity 20.

The cavity 22 is internally tapped at 24. A plug 26, externally threaded, is screwed into the cavity 22. In this plug there are a number of longitudinal drilled passageways 28. On the outer end of the plug and flush with the lower end of the body 12, there is a porous filter 30. Around the upper part of the plug 26, there are a number of radial passageways 32.

It is seen that the upper or inner end of the plug 26 bears against a diaphragm 34. The diaphragm is locked in place so that the main flexible portion is in the cavity 20. In the sidewall of the body 12 there is a drilled passageway 36 and which passageway leads to and connects with one of the radial passageways 32. In assembling the pressure detector 10 the plug 26 may be screwed into the tapped cavity 22 so that one of its radial passageways 32 registers with and connects with the drilled passageway 36. Also, there may be used a resin or an adhesive to firmly and definitely position the plug 26 in the cavity 22. The drilled passageway 36 may be considered to be a ground equalizing pressure passageway.

A flexible plastic tube 38 connects with the ground equalizing pressure passageway 36.

On the upper surface of the diaphragm 34, i.e., that surface away from the plug 26, there is attached a plunger 40. Said plunger 40 has a body portion 42 which rises into an upper larger part having a shoulder 44. The lateral cross-sectional area of the shoulder 44 is greater than the lateral cross-sectional area of the cavity 18 and therefore the plunger 40 will not move into the cavity 18. On the upper part of the plunger 40 there is a shaft 46.

The plunger 40 may be attached to the diaphragm 34 by means of an adhesive or a resin.

In the lower part of the cavity 16 there is a tubular member 50. The lower part of the tubular member 50 projects inwardly at 52 to form a passageway. Between the lower part of the tubular member 50 and the lower part of the cavity 16 there is positioned a quad ring 54. The inner part of the quad ring 54 is of slightly less diameter than the inner part of the member 52. A sphere or ball 56 rests upon the inner part of the quad ring 54. As is readily appreciated the quad ring 54 and the sphere 56 form a check valve.

In the upper part of the cavity 16 there is a tubular member 60 which in turn defines a cavity 62. The cavity 62 registers at the cavity 16. In the upper part of the tubular member 60 there is a passageway 64.

The tubular member 60 is positioned in the upper part of the cavity 16 and the lower end of the tubular member 60 bears against the upper part of the member 50. The tubular member 60 may be positioned in the body 12 by means of an adhesive or a resin.

In the passageway 64 there is positioned a flexible plastic tube 66 which may be identified as an incoming pressure tube.

It is seen that around the lower end of the tube 66 there is positioned a spring 68. The spring 68 bears against the ball or sphere 56 so as to close the check valve.

The tube 66 may be sealed inside of the tubular member 60 by means of an adhesive 71. There is a spacer 73 around the lower end of the tube 66. The upper part of the spring 68 bears against the lower surface of the spacer 73.

In the lower part of the body 12 there is a drilled passageway 70. This passageway connects with the cavity 20 and above the diaphragm 34. In effect, the passageway connects with the cavity 20, the cavity 18 and the cavity 16.

A flexible plastic tube 72 connects with the drilled passageway 70. The flexible plastic tube may be considered to be the outgoing pressure tube. The tube 72 may be positioned in the body 12 by means of an adhesive or resin 74.

In FIG. 2 it is seen that in the plunger 40 that there is a passageway 76. This passageway 76 makes it possible for communication, when the shoulder 44 of the plunger 40 bears against the lower surface of the body 12 around the passageway or cavity 18, between the cavity 20 and the cavity 18.

The body 12, tubes 38, 66 and 72 are encased in a protective material 80 such as a resin. The protective material 80 may be encased in a tubular plastic tube.

In operation, and when the pore pressure detector 10 is buried in the ground or the earth, the liquid flows through the porous filter 30, the passageways 28 in the plug 26, and against the diaphragm 34. This moves the diaphragm more into the cavity 20 and also moves the plunger 40 and the shaft 46 toward the sphere 56. The sphere 56 is moved out of contact with the quad ring 54 so as to open the check valve. At this time there is sufficient pore pressure or liquid pressure to measure. A gas, such as compressed air, is forced through the incoming pressure tube 66 and this gas bears against the diaphragm 34. When the incoming gas in the incoming pressure tube 66 is sufficient to move the diaphragm 34 away from the sphere 56 the spring 68 bears against the sphere 56 so as to seat the sphere 56 on the quad ring 54 and to close the check valve. This prevents the flow of gas through the check valve, into the cavities 18 and 20, through the passageways 70 and through the outgoing pressure tube 72. At this instant the pressure in the tube 66 and the pressure in the tube 72 will be the same. With an additional buildup of the pressure in the tube 66 there will be an additional buildup of pressure in the cavity 16 and the cavity 20. With the gauge for reading the pressure in the tube 66 and a gauge for reading the pressure in the tube 72 it is possible to determine when the pressure in the tube 66 exceeds the pressure in the tube 72. When this occurs, a party then knows that the pressure in the tube 72 is indicative of the pore pressure or the liquid pressure of the soil. In this manner the pore pressure or the liquid pressure in the soil is determined.

In FIGS. 3 and 3A there is illustrated a pore pressure detector 100 which is similar in construction to the pore pressure detector 10. Where applicable like reference numerals will be used for like components. The main difference between the two pore pressure detectors 10 and 100 is in the check valve mechanism.

In the lower end of the body 12 there is positioned a plug 102 which is externally threaded. In this plug 102 there are longitudinal passageways 104. The central portion of the plug 102, with respect to its inner end, is recessed to form a cavity 106. On the outer end of the plug 102 and in the body 12 there is positioned a filter 108. The filter 108 may be a fine wire or a porous stone or other suitable material such as sintered glass. There is a diaphragm 110 which has a central passageway 112. There projects through the diaphragm 110 and in the central passageway 112 a shaft 114 which is threaded on its external end. The shaft 114 is positioned on the diaphragm 110 by means of an upper nut 116 and a lower nut 118. The nuts 116 and 118 are on opposite sides of the diaphragm 110 or on opposite surfaces of the diaphragm 110. The shaft 114 projects upwardly into a head portion 120. On the head portion 120 there is a groove 122. An O-ring 124 is positioned in the groove 122.

In FIG. 3 it is seen that the diaphragm 110 has been moved upwardly and that the O-ring 124 is out of contact with the curved throat portion 126 of the cavity 62.

In FIG. 3A it is seen that the diaphragm 110 is in a downward position and that the O-ring 124 is now in contact with the curved throat portion 126 to close the check valve.

In operation, and with liquid having passed through the filter 108 and the passageways 104 and into the cavity 106 so as to bear against the diaphragm 110 thereby moving the shaft 114 upwardly and the O-ring 124 out of contact with the walls and the throat 126, it is now possible to measure the pore pressure. A gas, under pressure, is allowed to enter the tube 66. This gas bears against the upper surface of the diaphragm 110 so as to urge the diaphragm 110 downwardly and to urge the shaft 114 and the O-ring 124 downwardly. With sufficient pressure on the upper surface of the diaphragm 110 the pore pressure is counterbalanced so that the O-ring 124 bears against the curved throat 126 to close the check valve. Again with an increase in pressure in the tube 66 and the cavity 16 the pressure in the tube 66 exceeds the pressure in the tubes 72. At this time it is possible, by reading the pressure in the tube 72, to know the pore pressure.

In FIGS. 4 and 4A there is illustrated a pore pressure detector 150. The pore pressure detector 150 comprises a lower body 152, an upper body 154, and an inner body 156. The lower body 152 comprises a lower cavity 158, a cavity 160, a cavity 162 above the cavity 160, and a tapped cavity 164 above the cavity 162. In the wall of the lower body 152 there is a passageway 166 which connects on its inner end with the cavity 160. It is seen that the lateral cross-sectional area of the cavity 158 is greater than the lateral cross-sectional area of the cavity 160 so as to form a shoulder at the junction of the two. Also, the lateral cross-sectional area of the cavity 162 is greater than the lateral cross-sectional area of the cavity 160 so as to form a shoulder at the junction of the two. Again, the lateral cross-sectional area of the cavity 164 is greater than the lateral cross-sectional area of the cavity 162 so as to form a shoulder at the junction of the two.

In the cavity 162 there is an inner body 156. The lateral cross-sectional area of the inner body 156 is slightly less than the lateral cross-sectional area of the cavity 162 so that the inner body 156 will slide into and fit into the cavity 162. The inner body 156 has a lower cavity 170 and a cavity 172 positioned above the cavity 170 and connecting with the cavity 170. There is positioned above the cavity 172 a cavity 174 and which connects with the cavity 172. There is positioned above the cavity 174 a cavity 176 which is positioned above the cavity 174 and connects with the cavity 174. The diameter of the cavity 170 is greater than the diameter of the cavity 172 and at the junction of the two there is a shoulder. The diameter of the cavity 172 is greater than the diameter of the cavity 174 and at the junction of the two there is a shoulder. The diameter of the cavity 176 is greater than the diameter of the cavity 174 and at the junction of the two there is a shoulder. At the bottom of the inner body 156 there is a circular recess 178 and at the top of the inner body 156 there is a circular recess 180. The recesses 178 and 180 define a lip.

On the bottom of the inner body 156 and positioned in the recess 178 is a diaphragm 182. This diaphragm is a downwardly directed diaphragm. On the upper part of the inner body 156 and positioned in the recess 180 there is a diaphragm 184. This diaphragm is an upwardly directed diaphragm.

In the cavity 172 there is a body member 186 which has a passageway 188. Below the passageway 188 there is a cavity 190 and above the passageway 188 there is a cavity 192. In the cavity 190 there is an O-ring 194 and in the cavity 192 there is an O-ring 196. In the passageway 188 there is positioned a sphere or ball 198. In the cavity 172 there is positioned a member 200 having a longitudinal passageway 202 which connects with the cavity 190. In FIGS. 4 and 4A it is seen that the member 200 positions the body 186 in the cavity 172. Actually, the body 186 may be positioned in the cavity 172 by means of a resin or an adhesive and the member 200 may be positioned in the cavity 170 by means of a resin or an adhesive.

There is positioned in the cavity 174 and in the cavity 176 a shaft 204. The lower end of this shaft rests on the sphere 198. The upper end of the shaft is free but is positioned close to a nut 206. The shaft 204 is in a spring 208. The lower end of the spring 208 rests on the shoulder at the junction of the cavities 174 and 176. The upper end of the spring 208 bears against the lower surface of the nut 206.

In the diaphragm 184, in the center of the diaphragm, there is a passageway 210. A threaded shaft 212 projects through this passageway and is screwed into the tapped opening of the nut 206. On the threaded shaft 212 there is an attached washer 214.

It is seen that the inner body 156 and that part enclosed by the diaphragms 182 and 184 and the passageways are filled with a liquid such as a light oil.

The lower end of the upper body 154 has a cavity 220. There is positioned above the cavity 220 a cavity 222. The cavity 222 connects with the cavity 220. The upper part of the upper body 154 has a cavity 224. The cavity 224 connects with the cavity 222. The lateral cross-sectional area of the cavity 220 is greater than the lateral cross-sectional area of the cavity 222 and at the junction of these two cavities there is a shoulder. The lateral cross-sectional area of the cavity 224 is greater than the lateral cross-sectional area of the cavity 222 and at the junction of these two cavities there is a shoulder.

In the lower end of the cavity 224 there is positioned a member 226 and which member has a passageway 228. Also, the member 226 rests on a circular ring 230. A quad ring 234 rests on the shoulder at the junction of the cavities 222 and 224 and is inside of the circular ring 230 and is below the passageway 228. A sphere 236 is positioned in the passageway 228 and also in the member 226. The sphere 236 is urged in a downwardly direction by means of a spring 238. The upper end of the spring 238 is positioned around a tube 240. The tube 240 is positioned in an upper member 242. The upper member 242 has a cavity 244 and which cavity houses the spring 238 and the lower end of the tube 240.

The upper member 242 may be positioned in the cavity 244 by means of a resin or an adhesive. It is seen that the shaft 212 projects through the passageway or cavity 222 so as to contact the sphere 236. Also, it is seen that the sphere 236 and the quad ring 234 comprise a check valve.

On the lower end of the pore pressure detector 150 there is a filter 250. The filter 250 may be sintered glass or stone or other suitable material.

There connects with an upper part of the cavity 220 a cavity 252. There leads into the cavity 252 a tube 254. The inner end of the tube 254 is positioned by means of a resin or adhesive 256. Then, the lower end of the tube 240 is positioned in the cavity 244 by means of a resin or an adhesive 258.

The tube 240 corresponds to the tube 66 of the pore pressure detector 10 and the tube 254 corresponds to the tube 72 of the pore pressure detector 10.

In operation and with the pore pressure detector 150 buried in the ground or in the earthen structure, the liquid such as water filters through the filter 250, and some liquid enters through the passageway 166. With the buildup in pressure in the cavity 160 the diaphragm 182 is forced upwardly or toward the sphere 198. The liquid 260 inside of the diaphragm 182 is forced and against the sphere 198 so as to urge the sphere 198 toward the shaft 204. The shaft 204 moves against the nut 206 so as to urge upwardly the shaft 212. The shaft 212 unseats or removes the sphere 236 from the quad ring 234 or from the check valve. This opens a means of communication between the tube 240 and the tube 254. To determine the pore pressure, the pressure in the tube 240 is increased. The reading of the pressure in the tube 240 and the reading of the pressure in the tube 254 are taken. With the continual increase in the pressure in the tube 240, and in the cavity in the member 226, the pore pressure is finally equalized and exceeded so that the check valve comprising the quad ring 234 and the sphere 238 is closed. The pressure in the tube 254 is then constant. With further increase in the pressure in the tube 240 there is a difference in the pressures in the tubes 240 and 254. The pressure in the tube 254 is the pore pressure and can be read by means of a suitable gauge or other equipment.

The upper body 154 and part of the tubes 240 and 254 can be encased in a resin 262. This resin is a protective coat for the body and tubes. Also, there may be a tubular member 264 which encases the resin 262, the upper body 154 and the tubes 240 and 254.

In FIG. 4 it is seen that the check valve is open and in FIG. 4A it is seen that the check valve is closed.

In FIG. 1 there is schematically illustrated the control unit 270 for reading the pore pressure. The control unit 270 comprises a storage tank 272 for storing air under pressure. There connects with the storage tank 272 a pipe 274. A gauge 276 connects with the pipe 274. Also, the pipe 274 connects with a valve 278. The valve 278 connects with a pipe 280. A pipe 282 connects with the pipe 280. Also, the pipe 282 connects with the quick disconnect unit 284. The pipe 280 connects with a needle valve 286. The needle valve 286 connects with a pipe 288. The pipe 288 connects with a quick disconnect unit 290. A gauge 292 connects with the pipe 288. A gauge 294 connects with the quick disconnect unit 296. A pipe 298 connects with the pipe 288. The pipe 288 connects with a valve connection 300. A safety valve 302 connects with the pipe 298.

The reserve tank 272 may be charged with air, under pressure, by means of the quick disconnect unit 284. The quick disconnect unit 284 may be connected to a source of air under pressure so as to charge the tank 272. Also, the tank 272 may be charged by means of a hand pump connecting with the valve connection 300.

In operation a hole 310 is drilled in the ground or in the earthen structure. Then, the hole is partially filled with water. Then, approximately 12 inches of clean, medium to coarse sand 312 is placed in the bottom of the hole. The pore pressure detector unit 10, 100 or 150 is placed on top of the sand. Then, approximately 24 inches of clean, medium to coarse sand 314 is placed over the top of the pore pressure detector. Then, approximately 12 inches of bentonite balls 316 are placed in the hole to form a seal. The pore pressure detector is checked to determine if it works properly. The tube 66 or 240 is connected to the quick disconnect unit 290. The tube 72 or the tube 254 is connected to the quick disconnect unit 296. The valve 278 is opened and also the valve 286 is opened slightly. The pressure in the gauges 292 and 294 is allowed to increase approximately at a rate not to exceed 1 p.s.i. per second. As previously stated, when the pressure of the gauge 292 exceeds the pressure of the gauge 294 then the pore pressure is known. The pore pressure is indicated by the pressure of the gauge 294. Then the hole may be filled with earth 318.

The materials of construction of the pore pressure detector 10, 100 and 150 are of plastic. One of the plastics which can readily be used is methyl methacrylate. The tube 38 may be plastic and approximately one-sixteenth inch in diameter. The tubes 66, 240, 72 and 254 are of plastic and approximately one-eighth inch in diameter. These plastic tubes can stand approximately 2000 p.s.i.

The pore pressure detectors 10, 100 and 150 have approximately a 2 inch outside diameter. Also, these pore pressure detectors are approximately 5 inches in length.

In the pore pressure detector 100 the volume of liquid displaced upon the opening and closing of the check valve amounts to approximately 0.05 milliliters. And, in the pore pressure detector 150 the volume of liquid displaced in the opening and closing of the check valve and also in the opening and closing of the sphere or ball 198 with respect to the O-ring 196 and 194 is approximately 0.01 milliliters. In effect, it can be seen that there is practically no displacement of the liquid to achieve a reading of pore pressure.

With the use of a pore pressure detector made substantially of plastic and noncorrosive material, it is seen that there is substantially no chance of the detector becoming clogged and not giving a satisfactory reading. With electrical connections, in a pore pressure detector, there is considerable possiblity of the connections becoming corroded and fouled and not giving accurate readings or not giving readings. The tube 38 in the pore pressure detectors 10 and 100 allow the displacement of the liquid to be accomplished without substantially no hindrance due to movement of the liquid into the surrounding ground and earthen structure as there is freedom to move against atmospheric pressure. The passageway 166 in the pore pressure detector 150 allows liquid to move from the interior of the pore pressure detector to the exterior of the pore pressure detector with the movement of the diaphragm 182 so as to make it possible to realize an accurate reading.

I claim:

1. A pore pressure detector comprising:
   a body adapted to be placed under the ground surface having a first cavity and a second cavity positioned therein, said first cavity being in fluid communication with the liquid surrounding said body;
   a diaphragm means separating said first cavity and said second cavity;
   a fluid pressure means to impose an increasing pressure within said second cavity;
   valve means in said fluid pressure means to interrupt the pressurization of said second cavity, said valve means operatively connected to said diaphragm so that when the force against said diaphragm from said second cavity equals the force against said diaphragm from said first cavity said valve closes;
   means to measure the pressure in said second cavity comprising a pressure sensor in fluid communicating with said first chamber; and
   fluid passageway means communicating with said first chamber to remove gases from said first chamber.

2. The apparatus of claim 1 wherein said fluid passageway means is vented to the atmosphere.

3. The apparatus of claim 1 wherein said valve means comprises a sphere constructed and arranged to engage a valve seat when closed.

4. The apparatus of claim 1 wherein said valve means comprises a movable O-ring and seat therefor.

5. The apparatus of claim 1 wherein said valve means is urged toward a closed position by a spring means.

PO-1050
(5/69)

UNITED STATES PATENT OFFICE
CERTIFICATE OF CORRECTION

Patent No. 3574284      Dated April 13, 1971

Inventor(s) Petur Thordarson

It is certified that error appears in the above-identified patent and that said Letters Patent are hereby corrected as shown below:

Claim 1, line 18, should read --said second chamber, and--

Signed and sealed this 10th day of August 1971.

(SEAL)
Attest:

EDWARD M. FLETCHER, JR.      WILLIAM E. SCHUYLER, J
Attesting Officer      Commissioner of Patent